United States Patent
Deodhar et al.

(10) Patent No.: US 11,366,647 B2
(45) Date of Patent: Jun. 21, 2022

(54) AUTOMATIC COMPILER DATAFLOW OPTIMIZATION TO ENABLE PIPELINING OF LOOPS WITH LOCAL STORAGE REQUIREMENTS

(71) Applicant: Intel Corporation, Santa Clara, CA (US)

(72) Inventors: Rajiv Deodhar, Phoenix, AZ (US); Sergey Dmitriev, Novosibirsk (RU); Daniel Woodworth, Hudson, MA (US); Rakesh Krishnaiyer, Milpitas, CA (US); Kent Glossop, Nashua, NH (US); Arvind Sudarsanam, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 16/863,315

(22) Filed: Apr. 30, 2020

(65) Prior Publication Data
US 2020/0257510 A1 Aug. 13, 2020

(51) Int. Cl.
*G06F 9/315* (2018.01)
*G06F 9/38* (2018.01)
(Continued)

(52) U.S. Cl.
CPC .............. *G06F 8/433* (2013.01); *G06F 9/381* (2013.01); *G06F 9/3838* (2013.01);
(Continued)

(58) Field of Classification Search
CPC . G06F 8/456; G06F 8/41; G06F 8/443; G06F 8/4452; G06F 8/34; G06F 8/447; G06F 8/4434; G06F 8/4441; G06F 8/452; G06F 9/325; G06F 9/3851; G06F 9/30101; G06F 9/3867; G06F 9/3013; G06F 9/30181; G06F 9/3012; G06F 9/30047;
(Continued)

(56) References Cited

U.S. PATENT DOCUMENTS

| 7,343,594 B1* | 3/2008 | Metzgen | G06F 30/34 717/140 |
| 8,881,124 B2* | 11/2014 | Baba | G06F 8/452 717/150 |

(Continued)

OTHER PUBLICATIONS

Hamid Reza Zohouri et al., Evaluating and Optimizaing OpenCL Kernels for High Performance Computing with FPGAs, Nov. 2016, [Retrieved on Dec. 10, 2021]. Retrieved from the internet: <URL: https://ieeexplore.ieee.org/stamp/stamp.jsp?tp=&arnumber= 7877113> 12 Pages (409-420) (Year: 2016).*

(Continued)

*Primary Examiner* — Anibal Rivera
(74) *Attorney, Agent, or Firm* — Jordan IP Law, LLC

(57) ABSTRACT

Systems, apparatuses and methods may provide for technology that detects one or more local variables in source code, wherein the local variable(s) lack dependencies across iterations of a loop in the source code, automatically generate pipeline execution code for the local variable(s), and incorporate the pipeline execution code into an output of a compiler. In one example, the pipeline execution code includes an initialization of a pool of buffer storage for the local variable(s).

21 Claims, 8 Drawing Sheets

(51) Int. Cl.
    *G06F 9/44*     (2018.01)
    *G06F 8/41*     (2018.01)
    *G06F 9/345*     (2018.01)
    *G06F 9/32*     (2018.01)
    *G06F 9/30*     (2018.01)

(52) U.S. Cl.
    CPC ............ *G06F 9/3867* (2013.01); *G06F 8/443* (2013.01); *G06F 8/447* (2013.01); *G06F 8/452* (2013.01); *G06F 8/456* (2013.01); *G06F 9/3001* (2013.01); *G06F 9/3013* (2013.01); *G06F 9/30174* (2013.01); *G06F 9/325* (2013.01); *G06F 9/3455* (2013.01); *G06F 9/3851* (2013.01)

(58) Field of Classification Search
    CPC ... G06F 9/3455; G06F 9/3001; G06F 9/30174
    See application file for complete search history.

(56) References Cited

U.S. PATENT DOCUMENTS

| | | | | |
|---|---|---|---|---|
| 11,093,682 | B2* | 8/2021 | Pelton | G06F 30/32 |
| 2004/0151209 | A1* | 8/2004 | Cummings | G06F 13/423 |
| | | | | 370/503 |
| 2013/0024849 | A1* | 1/2013 | Baba | G06F 8/452 |
| | | | | 717/150 |
| 2013/0205123 | A1* | 8/2013 | Vorbach | G06F 9/3013 |
| | | | | 712/221 |
| 2018/0189231 | A1 | 7/2018 | Fleming et al. | |
| 2020/0004538 | A1 | 1/2020 | Fleming et al. | |
| 2020/0226228 | A1* | 7/2020 | Pelton | G06F 1/12 |

OTHER PUBLICATIONS

Janis Sermulins et al., Cache Aware Optimization of Stream Programs, Jun. 15-17, 2015, [Retrieved on Dec. 10, 2021]. Retrieved from the internet: <URL: https://dl.acm.org/doi/pdf/10.1145/1065910.1065927> 12 Pages (115-126) (Year: 2005).*

U.S. Appl. No. 16/259,608, entitled "Automated Resource Usage Configuration For Deep Learning Neural Network Workloads On Multi-Generational Computing Architectures," filed on Jan. 28, 2019, 45 pages.

U.S. Appl. No. 16/456,953, entitled "Control Speculation in Dataflow Graphs," filed on Jun. 28, 2019, 55 pages.

International PCT Patent Application No. PCT/CN2019/115865, entitled "Multi-Stage Automatic Compilation For Vector Computations In Applications," filed on Nov. 6, 2019, 39 pages.

K. Fleming Jr., "Scalable Reconfigurable Computing Leveraging Latency-Insensitive Channels," Feb. 2013, 197 pages, Massachusetts Institute of Technology, Cambridge, MA.

Extended European Search Report for European Application No. 20214388.9 dated Jun. 7, 2021, 12 pages.

Weinhardt et al., "Memory Access Optimization for Reconfigurable Systems," IEE Proceedings—Computers and Digital Techniques, vol. 148, No. 3, May 23, 2021, 16 pages.

Cardoso et al., "Compiling for Reconfigurable Computing: A Survey," ACM Computing Surveys, vol. 42, No. 4, Article 13, Jun. 2010, 65 pages.

* cited by examiner

```
int f(int n, int x, int y, int* a)
{
   for (int i=0; i<n; i++) {
     int b[100];
     for (int j=x; j<y; j++) {
       b[j] = i;
     }
     a[i] = a[i] + b[6];
   }
   return a[5];
}
```

32

```
static void SpGEMMKernel(int ibegin, int iend, int n, int k,
    const int *rowptrA, const int *colidxA, const FLOAT *valA,
    const int *rowptrB, const int *colidxB, const FLOAT *valB,
    const int *rowptrC, int *colidxC, FLOAT *valC)
{
    #pragma omp parallel for dataflow(pipeline(8))
      for (int i = ibegin; i < iend; i++) {
          // Private variable
          FLOAT spa[n];
          memset(spa, 0, sizeof(FLOAT) * n);
          int startA = rowptrA[i];
          int endA = rowptrA[i + 1];
          for (int j = startA; j < endA; j++) {
              int idxA= colidxA[j];
              double vA = valA[j];
              int startB= rowptrB[idxA];
              int endB= rowptrB[idxA + 1];
              for (int k = startB; k < endB; k++) {
                  int idxB = colidxB[k];
                  double vB = valB[k];
                  spa[idxB] += vA * vB;
              } // for (int k = startB; k < endB; k++)
          } // for (int j = startA; j < endA; j++)
          int idxC = rowptrC[i];
          for (int j = 0; j < n; j++) {
              if (spa[j] != 0.0) {
                  colidxC[idxC] = j;
                  valC[idxC] = spa[j];
                  idxC++;
                  spa[j] = 0.0;
              }
          } // for (int j = 0; j < n; j++)
      } // for (int i = 0; i < m; i++)
}
```

FIG. 2B

```
34 → int f(int n, int x, int y, int* a)
      {
        int b[100];
        #pragma omp parallel for private(b)
        for (int i=0; i<n; i++) {
          for (int j=x; j<y; j++) {
            b[j] = i;
          }
          a[i] = a[i] + b[6];
        }
        return a[5];
      }
```

FIG. 2C

```
36 → int f(int n, int x, int y, int* a)
{
   #pragma omp parallel for
   for (int i=0; i<n; i++) {
#if CONSTANT_SIZE
      // Constant-sized array, dynamically allocated
      int* b = (int *)malloc(100 * sizeof(int));
#else
      // Variable-sized array, dynamically allocated
      int* b = (int *)malloc(n * sizeof(int));
#endif
      for (int j=x; j<y; j++) {
        b[j] = i;
      }
      a[i] = a[i] + b[6];
      ...
   }
   return a[5];
}
```

FIG. 2D

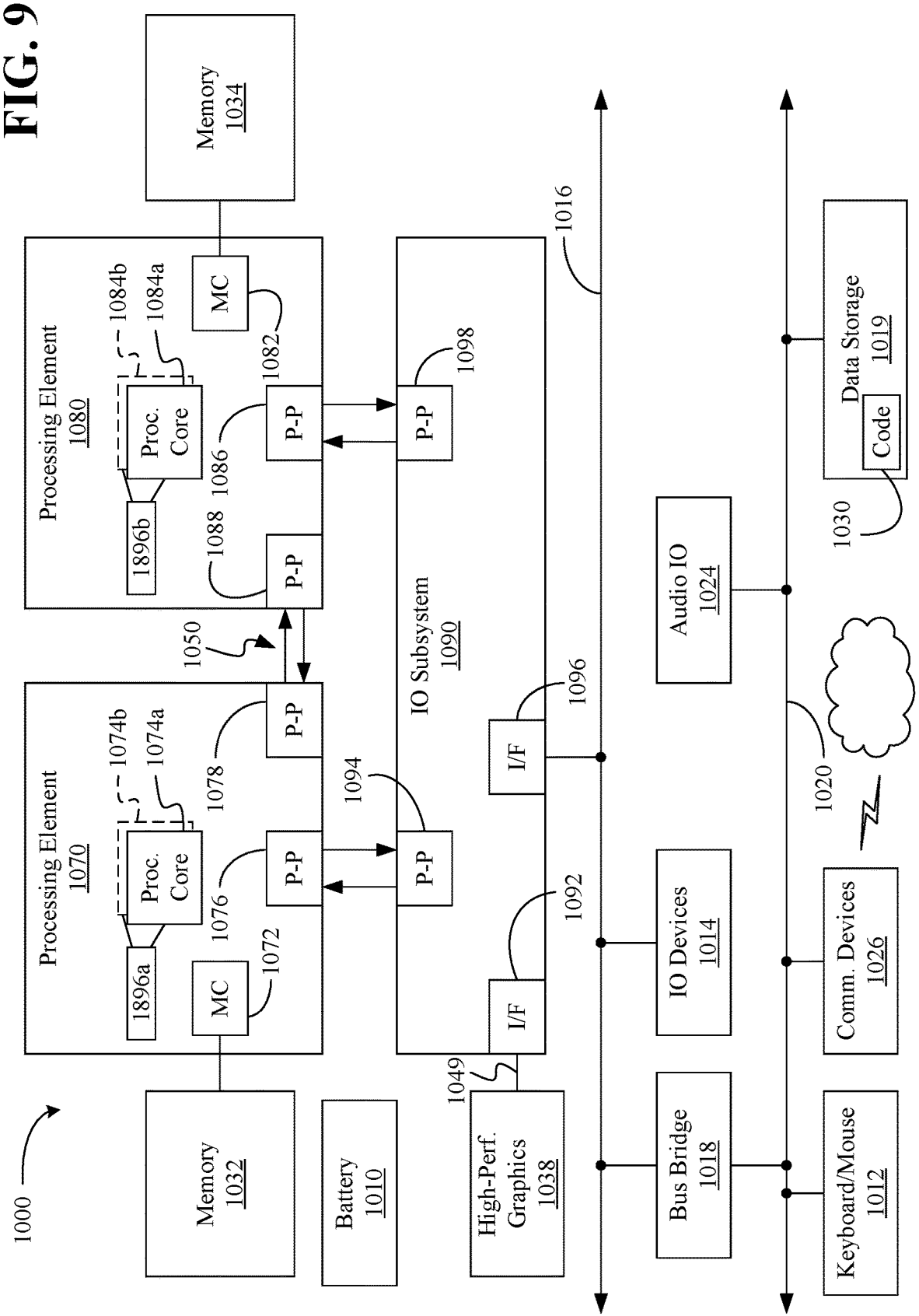

AUTOMATIC COMPILER DATAFLOW OPTIMIZATION TO ENABLE PIPELINING OF LOOPS WITH LOCAL STORAGE REQUIREMENTS

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

Embodiments generally relate to compilers. More particularly, embodiments relate to automatic compiler dataflow optimizations to enable pipelining of loops with local storage requirements.

BACKGROUND

Dataflow graphs may be used to model computer source code in terms of the dependencies between individual operations performed by the code. A compiler may transform the source code into the dataflow graph, which is typically executed by accelerator hardware such as a field programmable gate array (FPGA), configurable spatial accelerator (CSA), or other dataflow architecture. While the accelerator hardware may be useful when dealing with high performance computing (HPC) and/or data center applications that operate on relatively large data arrays and structures, there remains considerable room for improvement. For example, if the operations of the source code involve the execution of loops that internally declare "private" variables for large data arrays, the ability to hold (e.g., "registerize") the underlying data in the internal channels (e.g., communication arcs, buffers, latency insensitive channels/LICs, etc.) of the accelerator may be limited. As a result, the private variables may be treated as purely memory-based variables, which may cause performance losses.

BRIEF DESCRIPTION OF THE DRAWINGS

The various advantages of the embodiments will become apparent to one skilled in the art by reading the following specification and appended claims, and by referencing the following drawings, in which:

FIG. 2B is a source code listing of an example of a loop with runtime-varying local storage according to an embodiment;

FIG. 2C is a source code listing of an example of a loop with an explicitly designated private variable according to an embodiment;

FIG. 2D is a source code listing of an example of a loop with a dynamically allocated local variable according to an embodiment;

FIG. 9 is a block diagram of an example of a multi-processor based computing system according to an embodiment.

DESCRIPTION OF EMBODIMENTS

Figures 1, 2A:
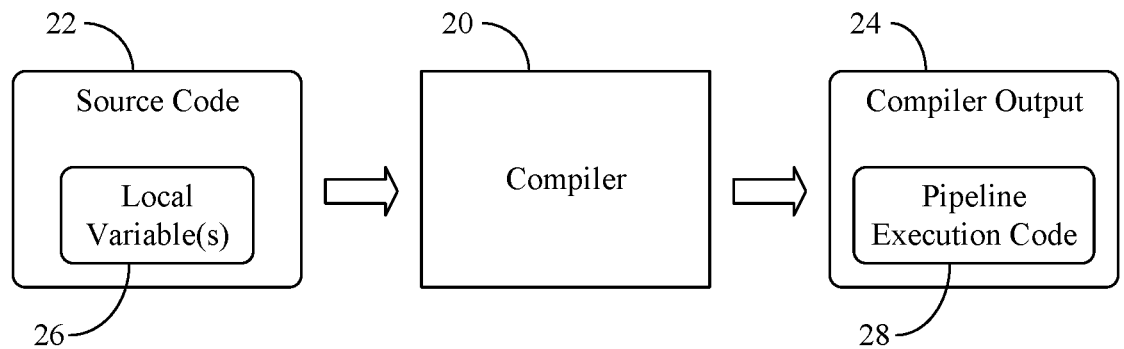
FIG. 1 is a block diagram of an example of a compiler output according to an embodiment.
FIG. 2A is a source code listing of an example of a loop with fixed-size local storage according to an embodiment.

Turning now to FIG. 1, a compiler 20 is shown, where the compiler 20 automatically transforms source code 22 into an output 24 that is executable by a dataflow architecture such as, for example, an FPGA, CSA, and so forth. In an embodiment, the source code 22 is written in a high-level language such as, for example, C, C++, or Fortran augmented by parallel annotations (e.g., OpenMP parallel pragmas) to achieve runtime parallelism in the dataflow architecture. The source code 22 may generally use loops to perform various operations. Indeed, the runtime performance of applications may be dominated by the time spent in executing loops to perform tasks. On a dataflow architecture such as CSA, the performance of parallel loops may be accelerated by a) creating multiple copies of the loop bodies (e.g., "workers"), b) executing the workers in parallel, and c) pipelining execution of the workers.

In the illustrated example, the source code 22 contains one or more local variables 26 (e.g., private variables), which lack dependencies across iterations of the loops in the source code 22. As will be discussed in greater detail, such a variable might occur naturally when declared inside a loop. In an embodiment, the local variable(s) 26 are occasionally used for relatively large data arrays. To improve the throughput of the loops containing the local variable(s) 26 in such a case, the illustrated compiler 20 generates pipeline execution code 28 for the local variable(s) 26 and incorporates the pipeline execution code 28 into the output 24 of the compiler 20. Thus, the illustrated local variables are allocated in a way that each loop iteration gets its own copy, thereby permitting pipelined execution. As already noted, pipelining execution of the workers may significantly enhance performance.

FIG. 2A shows source code 30 containing a loop (e.g., "for (int i=0; i<n; i++)") that declares a variable "b", which may be considered a local variable because it lacks dependencies across iterations of the loop. In the illustrated example, the variable has a fixed size (e.g., an array of 100 integers). Thus, the local storage requirements of the variable b are fixed and statically known to the compiler. The illustrated source code 30 may be readily substituted for the source code 22 (FIG. 1), already discussed. Accordingly, pipeline execution code may be automatically generated for the illustrated local variable.

FIG. 2B shows source code 32 containing a loop (e.g., "for (int i=ibegin; i<iend; i++)") that declares a variable "spa", which also lacks dependencies across iterations of the loop and is considered a local variable. In the illustrated example, the size of the variable varies and is only known at runtime. The illustrated source code 32 may be readily substituted for the source code 22 (FIG. 1), already discussed. Accordingly, pipeline execution code may be automatically generated for the illustrated local variable.

FIG. 2C shows source code 34 containing a loop (e.g., "for (int j=x; j<y; j++)") that uses a variable "b", where the variable b is explicitly designated as a private variable (e.g., using the "private" clause). Other explicit clauses such as "firstprivate", "lastprivate", "reduction", etc., may also be used. In the illustrated example, the variable has a fixed size (e.g., an array of 100 integers). Thus, the local storage requirements of the variable b are fixed and statically known to the compiler. The illustrated source code 34 may be readily substituted for the source code 22 (FIG. 1), already discussed. Accordingly, pipeline execution code may be automatically generated for the illustrated local variable.

FIG. 2D shows source code 36 containing a loop (e.g., "for (int i=0; i<n; i++)") that dynamically allocates memory for a variable "b" from within the loop. In the illustrated example, the variable is a local variable that lacks dependencies across iterations of the loop and the size of the variable may either remain constant or vary. The illustrated source code 36 may be readily substituted for the source code 22 (FIG. 1), already discussed. Accordingly, pipeline execution code may be automatically generated for the illustrated local variable.

Figure 3:
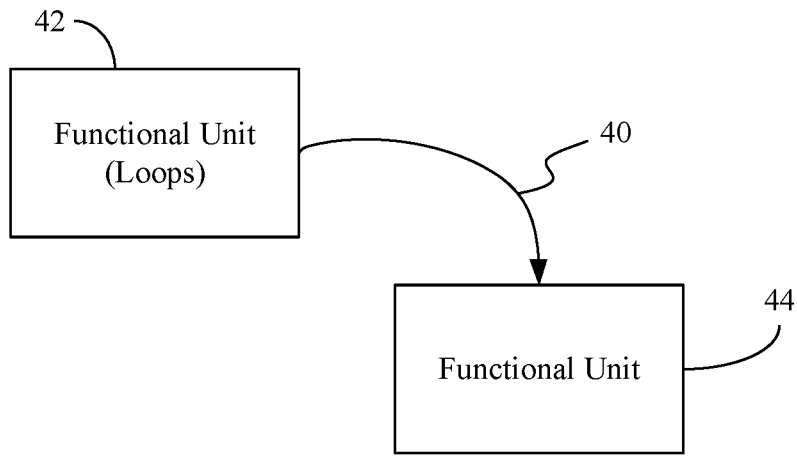
FIG. 3 is a block diagram of an example of a communication arc in a dataflow graph according to an embodiment.

Turning now to FIG. 3, a communication arc 40 (e.g., LIC) between a first functional unit 42 (e.g., node) in a dataflow graph and a second functional unit 44 in the dataflow graph is shown. In the illustrated example, the functional units 42 and 44 are used to perform operations in a loop on data associated with local variables. In an embodiment, the communication arc 40 includes buffer storage (not shown) such as, for example, one or more line buffers, FIFO (first in first out) buffers, etc., which may be used to hold values that enable apportioning data associated with local variables in the loop to different loop iterations.

Figure 4:
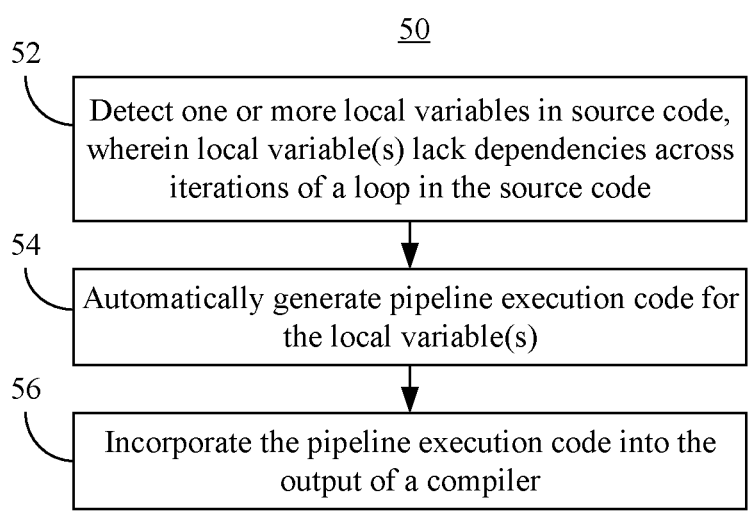
FIG. 4 is a flowchart of an example of a method of operating a compiler according to an embodiment.

FIG. 4 shows a method 50 of operating a compiler. The method 50 may generally be implemented in a compiler such as, for example, the compiler 20 (FIG. 1), already discussed. More particularly, the method 50 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for detecting one or more local variables in source code, wherein the local variable(s) lack dependencies across iterations of a loop in the source code. The source code may be associated with a communication channel as, for example, the communication arc 40 (FIG. 3) in a dataflow graph. In an embodiment, block 52 includes automatically parsing and/or searching the source code for loops with fixed-size local storage (e.g., as in FIG. 2A), runtime-varying local storage (e.g., as in FIG. 2B), explicitly designated private variables (e.g., as in FIG. 2C), dynamically allocated local variables (e.g., as in FIG. 2D), and so forth. Moreover, block 52 may be conducted after a registerization of the source code.

Block 54 automatically generates (e.g., in response to the detection of the one or more local variables) pipeline execution code for the local variable(s). As will be discussed in greater detail, block 54 may include generating executable instructions to initialize a pool of buffer storage for the local variable(s), define a pipeline depth, and define a plurality of tokenized slots in the initialized pool of buffer storage. In one example, the initialized pool of buffer storage is greater than the local storage amount corresponding to a single iteration of the loop. Moreover, each tokenized slot may correspond to a pipelined iteration of the loop. Illustrated block 56 incorporates the pipeline execution code into the output of the compiler. The method 50 therefore enhances performance by enabling the pipelining of loops containing private data, which improves throughput. Indeed, the overall cycles needed to execute a loop may be significantly less than the product of static loop cycles (e.g., the number of cycles needed to execute one iteration of the loop) and the loop iteration count.

Figure 5:
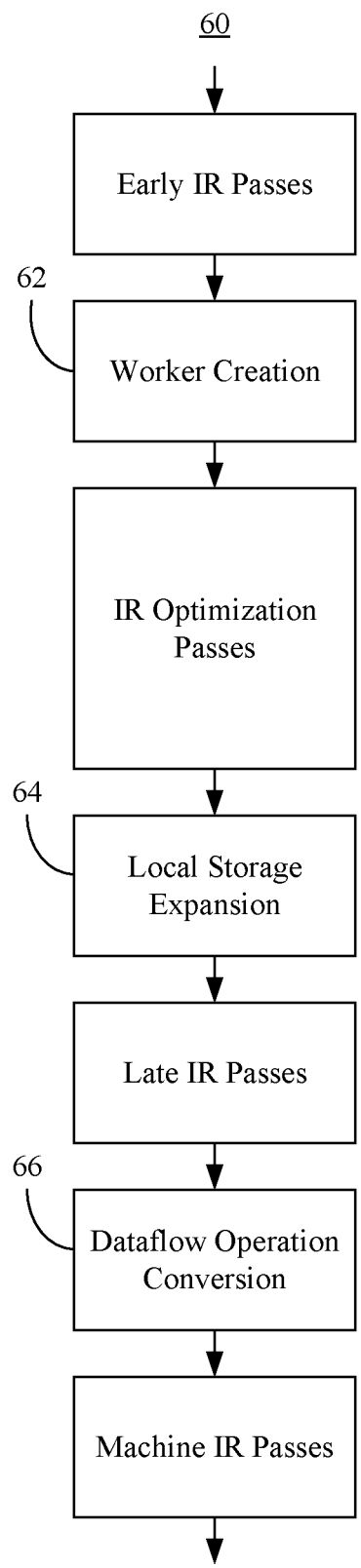
FIG. 5 is a block diagram of an example of a compiler according to an embodiment.

FIG. 5 shows a compiler 60 that may implement one or more aspects of the method 50 (FIG. 4), already discussed. Additionally, the compiler 60 may be readily substituted for the compiler 20 (FIG. 1), already discussed. In general, the compiler 60 enables pipelined execution of loops containing local variables and may be explained with reference to a piece of sample source code and compiler-generated pseudo-code. For further reference, the end of this disclosure includes actual intermediate representation (IR) results using an LLVM compiler for a similar sample before and after the principal compiler transformations described herein.

Using dynamically allocated local storage in a loop as an example, with a constant array size of 100 chosen for simplicity, it may be assumed that the compiler 60 selects two workers for the loop and chooses a pipeline depth of three for each worker loop.

An OpenMP language extension may also be implemented to allow explicit control over worker creation and pipeline depth. Such an extension may be considered optional.

The OpenMP language extension is:

```
#pragma omp ...
   dataflow([num_workers[(<n>)]],
   [static](<chunksize>)]],
   [pipeline](<depth>)]])
      for-loops
```

The pipeline(depth) sub-clause specifies how many loop iterations are to be allowed to execute concurrently. The num_workers and static clauses specify how many workers to create and the way to distribute the loop iterations across the workers. Other parallel annotation languages and/or APIs (application programming interfaces) such as OpenACC, OpenCL, SYCL, etc., may also be used.

The solution for correctly handling private variables in pipelined loops may span many passes in the compiler 60. The transformations are in three places as shown in FIG. 5:

A worker creation stage 62 may be used when local storage arises from OpenMP clauses. In an embodiment, the worker creation stage 62 replaces OpenMP directives with expansions for multiple workers. The worker creation stage 62 may also represent local storage using dynamic allocation. Pseudocode for the worker creation stage 62 is provided below.

```
Loop:
  b = alloca ...
  // the body of this loop references the local variable b
  ...
  <inner j-loop>
  ...
End-loop:
```

A local storage expansion stage 64 handles a relatively large portion of the transformations described herein. In one example, the local storage expansion stage 64 handles allocation and referencing of private variables that remain. The pass of the illustrated stage 64 is conducted relatively late to allow other compiler optimizations to registerize local variables as far as possible. Accordingly, variables that could not otherwise be registerized are dealt with in the stage 64. If a loop has a set S of private variables, then the stage 64 creates an array of type S with dimension the pipeline depth, which is dynamic count of iterations in flight.

A dataflow operation conversion stage 66 may handle the management of the individual slots in the private variable array created for each loop.

Worker Creation

The worker creation stage 62 may create multiple workers as directed by OpenMP directives. For non-OpenMP loops, the worker creation stage 62 may automatically decide the number of workers to generate. Similarly, OpenMP directives may specify the pipeline depth, or the compiler 60 may select the degree of pipelining to generate. For the purposes of discussion, it is assumed that two workers are created and that a pipeline depth of three is selected.

A pair of LLVM IR intrinsics may be introduced to support loop-local storage:
  r=pipeline.limited.entry(int id, int depth)
  pipeline.limited.exit(r)

These intrinsics enclose the loops that need local storage. The arguments of the "entry" call specify the pipeline depth and mark the place where allocation for the enclosed loops occurs. The "exit" marks the deallocation point. This representation ensures that independent of the number of workers generated, a single allocation/deallocation is done for the loops.

Pseudo-code of the original single loop after the worker creation stage 62 is shown below. In the illustrated example, the original loop has been replicated to form two workers. Additionally, the local variable in the original loop becomes a separate local variable in each of the new loops. Pipelining has not been accounted for yet and is done later in the local storage expansion stage 64. The pseudo-code after processing by the worker creation stage 62 might be:

```
depth.region = pipeline.limited.entry(id1, 3)
// Worker 0
region0 = parallel.region.entry(id2)
Loop0:
  b.priv.0 = alloca ...
  // all uses of b in the loop are replaced with b.priv.0
  ...
  <inner j-loop>
  ...
End-loop0:
parallel.region.exit(region0)
// Worker 1
region1 = parallel.region.entry(id3)
Loop1:
  b.priv.1 = alloca ...
  // all uses of b in the loop are replaced with b.priv.1
  ...
  <inner j-loop>
  ...
End-loop1:
parallel.region.exit(region1)
pipeline.limited.exit(depth.region)
```

Local Storage Expansion

In an embodiment, the local storage expansion stage 64 performs the transformation to account for pipelining. The pipeline depth of three is enforced using the concept of a token and a pool of three token values is created for each worker. In one example, an iteration may begin when a token can be obtained from the pool. This operation is modeled by a call to "token.take", which completes only when a local storage slot becomes available. When an iteration is completed, the token is returned to the pool. This return is modeled by a call to "token.return". In one example, since only three distinct token values exist, only three iterations can execute concurrently in each worker.

Pseudo-code after the local storage expansion stage 64 might be:

```
// Local variable pool declaration
#define num_workers 2
#define depth 3
struct worker_pool {
  struct loop_pool {
    double B[100];
  } ls[depth];
} pool[num_workers];
// Allocate the pool
pool = CsaMemAlloc(sizeof(worker_pool));
// Worker 0
w0 = &pool[0];
Loop0:
  // token.take will return one of these values:
  // &w0.1s[0], &w0.1s[1], ..., w0.1s[depth-1]
  w0_pool = token.take(w0, sizeof(ls), depth);
  B_loop_local = &w0_pool.B;
  // all uses of B in the loop are replaced with B_loop_local
  ...
  <inner j-loop>
  token.return(pool, w0_pool);
End-loop0:
// Worker 1
w1 = &pool[1];
Loop 1:
  // token.take will return one of these values:
  // &w1.1s[0], &w1.1s[1], ..., w1.1s[depth-1]
  w1_pool = token.take(w1, sizeof(ls), depth);
  B_loop_local = &w1_pool.B;
  // all uses of B in the loop are replaced with B_loop_local
  ...
  <inner j-loop>
  token.return(pool, w1_pool);
```

```
End-loop 1:
    // Deallocate the pool
    CsaMemFree(pool);
```

Dataflow Operation Conversion

The final stage in implementing loop-local storage is during the dataflow operation conversion stage 66, which converts IR code into dataflow operations. The intrinsics token.take and token.return may be abstract representations of a mechanism that doles out a fixed number of tokens. In an embodiment, the physical implementation of this mechanism uses CSA LICs. The fundamental property of CSA LICs is to hold multiple values, to deliver values from one end of the LIC when read, and to write values at the other end of the LIC when written. This property may be used to permit only a fixed number of values to circulate through the loop body. In one example, the depth of the LIC is chosen to be the user-specified pipeline depth. Additionally, the values in the LIC may be offsets of individual slots allocated for the private variables of a loop. When a new iteration of the loop begins, a value is read from the LIC and added to a base address to generate the slot address for the current iteration of the loop. When the iteration completes, the offset may be written back to the LIC. Because the LIC holds only "depth" number of values, only depth number of iterations may execute concurrently, with each using a separate local storage slot. Example dataflow operations that implement this scheme are shown below.

In a dataflow machine, instructions execute when their input dependencies are satisfied. In the following, an "inord" is an input ordinal (e.g., a signal that an input dependence has been satisfied) and an "outord" is generated by an instruction when the instruction completes execution to indicate that the result in now available. The gate64, add64 and mov instructions are explained first, and then their use in implementing token.take and token.return.

gate64 result, inord, value

The instruction does not execute until inord is available. Then, "value" becomes available as the result.

add64 result, input1, input2

The instruction does not execute until input1 and input2 are available. Then, "result" becomes available as the sum of "input1" and "input2".

mov0 result, inord, value

The instruction does not execute until "inord" is available. Then, "value" becomes available as the result.

The pseudocode below is an example output of the dataflow operation conversion stage 66 for a CSA implementation.

```
// Each loop iteration requires 400 bytes of local storage
// There are 2 workers created for the original loop
// A pipeline depth of 3 is implemented
// Total local storage = 400 * 3 * 2 bytes = 2400 bytes
// Worker0 uses a pool that ranges from bytes 0 to 1199
// Worker1 uses a pool that ranges from bytes 1200 to 2399
// Within each worker's pool, the 3 slots have offsets 0, 400, 800
// A LIC of depth 3 is initialized with offset values:
// offset_of(slot0), offset_of(slot1), offset_of(slot2)
.lic@8 .i64 %slot_offset % slot_offset:ci64 = init64 0
% slot_offset:ci64 = init64 400
% slot_offset:ci64 = init64 800
...
...
```

```
// token_take implemented on CSA
// Dynamic memory allocation outside the loop generates the pool address
pool = ...... // Equivalent of CsaMemAlloc(2400)
...
// In the loop, when the token_take is ready to execute
//the pool address is made available to the add64 instruction
gate64 pool_gated, token_take_inord, pool
// The address of the local storage slot assigned to this iteration
// is computed
add64 slot_addr,_slot_offsets,_pool_gated
....
....
// token_return implemented on CSA
// In the loop, when the token_return is ready to execute
// The slot_offset is written back at the end of the LIC
gate64 slot_offsets, token_return_inord, slot_offsets
// the completion of token_return is signaled with this mov0
mov0 token_return_outord, token_return inord
```

In this way, the dataflow properties of CSA LICs are exploited to enable pipelining of parallel loops while guaranteeing that enough local storage is available for dynamic loop iterations. The compiler 60 may conduct this transformation automatically and a prototype OpenMP language extension has been implemented to demonstrate the advantages of the solution.

Figure 6:
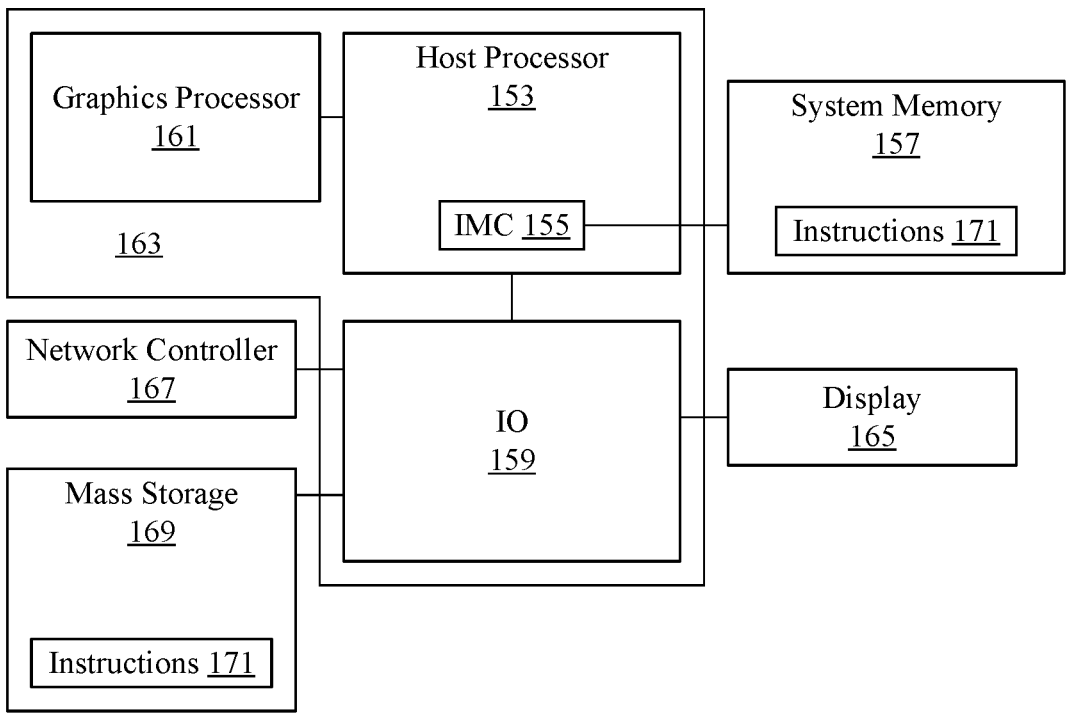
FIG. 6 is a block diagram of an example of a performance-enhanced computing system according to an embodiment.

Turning now to FIG. 6, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 151 includes a host processor 153 (e.g., central processing unit/CPU) having an integrated memory controller (IMC) 155 that is coupled to a system memory 157.

The illustrated system 151 also includes an input output (10) module 159 implemented together with the host processor 153 and a graphics processor 161 (e.g., graphics processing unit/GPU) on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), and mass storage 169 (e.g., hard disk drive/HDD, optical disk, solid state drive/SSD, flash memory).

In an embodiment, the host processor 153, the graphics processor 161 and/or the IO module 159 execute instructions 171 retrieved from the system memory 157 and/or the mass storage 169 to perform one or more aspects of the method 50 (FIG. 4), already discussed. Thus, execution of the illustrated instructions 171 may cause the computing system 151 to detect one or more local variables in source code, wherein the one or more local variables lack dependencies across iterations of a loop in the source code, automatically generate pipeline execution code for the one or more local variables, and incorporate the pipeline execution code into an output of a compiler.

In an embodiment, the pipeline execution code includes an initialization of a pool of buffer storage for the one or more local variables. In such a case, the initialized pool of buffer storage may be greater than (e.g., several multiples of)

a local storage amount corresponding to a single iteration of the loop. Moreover, the pipelined execution code may further include a definition of a plurality of tokenized slots in the initialized pool of buffer storage, where each tokenized slot corresponds to a pipelined iteration of the loop. In an embodiment, the pipelined execution code further includes a pipeline depth definition. In one example, the local variable(s) are detected after a registerization of the source code and the source code is associated with a communication channel in a dataflow graph. Additionally, the automatic generation of the pipeline execution code may be conducted in response to the detection of the local variable(s).

The illustrated system 151 is therefore performance-enhanced at least to the extent that the pipelining of loops containing private data improves throughput. Indeed, the overall cycles needed to execute a loop may be significantly less than the product of static loop cycles and the loop iteration count.

Figure 7:
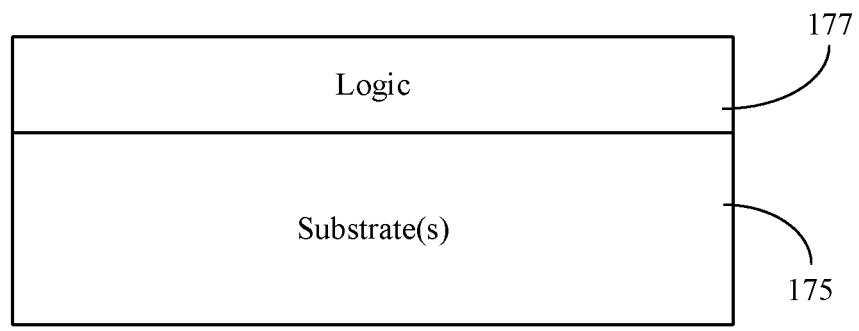
FIG. 7 is an illustration of an example of a semiconductor apparatus according to an embodiment.

FIG. 7 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 50 (FIG. 4), already discussed. Thus, the logic 177 may detect one or more local variables in source code, wherein the local variable(s) lack dependencies across iterations of a loop in the source code, automatically generate pipeline execution code for the local variable(s), and incorporate the pipeline execution code into an output of a compiler. The illustrated apparatus 173 is therefore performance-enhanced at least to the extent that the pipelining of loops containing private data improves throughput. Indeed, the overall cycles needed to execute a loop may be significantly less than the product of static loop cycles and the loop iteration count.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 8:
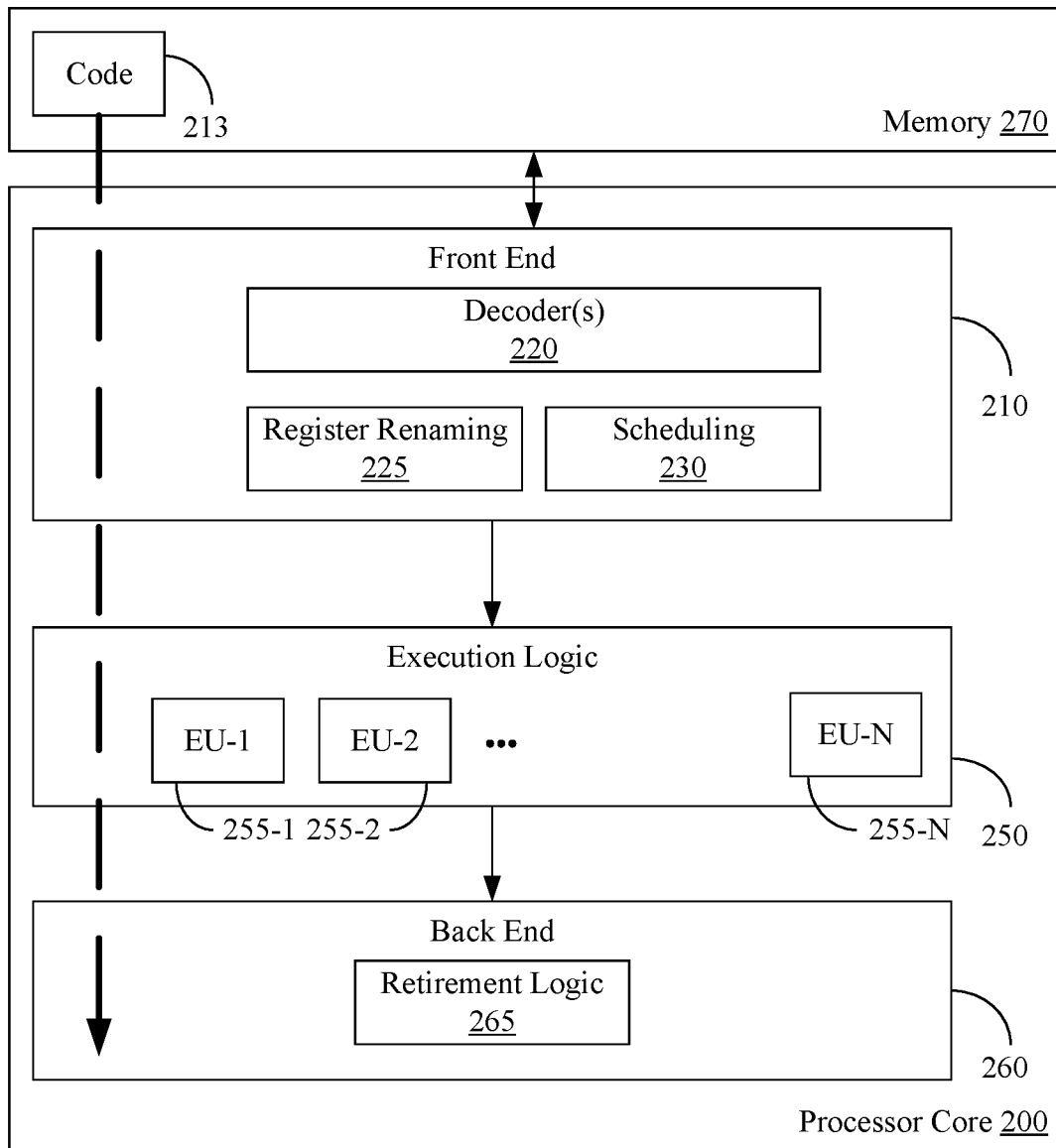
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache

1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 50 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 includes a performance-enhanced computing system comprising a network controller, a processor coupled to the network controller, and a memory coupled to the processor, the memory including a set of executable program instructions, which when executed by the processor, cause the processor to detect one or more local variables in source code, wherein the one or more local variables lack dependencies across iterations of a loop in the source code, automatically generate pipeline execution code for the one or more local variables, and incorporate the pipeline execution code into an output of the compiler.

Example 2 includes the computing system of Example 1, wherein the pipeline execution code is to include an initialization of a pool of buffer storage for the one or more local variables.

Example 3 includes the computing system of Example 2, wherein the initialized pool of buffer storage is to be greater than a local storage amount corresponding to a single iteration of the loop.

Example 4 includes the computing system of Example 2, wherein the pipeline execution code is to further include a definition of a plurality of tokenized slots in the initialized pool of buffer storage, and wherein each tokenized slot is to correspond to a pipelined iteration of the loop.

Example 5 includes the computing system of Example 1, wherein the pipeline execution code is to include a pipeline depth definition.

Example 6 includes the computing system of any one of Examples 1 to 5, wherein the one or more local variables are to be detected after a registerization of the source code, automatic generation of the pipeline execution code is to be in response to detection of the one or more local variables, and the source code is to be associated with a communication channel in a dataflow graph.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect one or more local variables in source code, wherein the one or more local variables lack dependencies across iterations of a loop in the source code, automatically generate pipeline execution code for the one or more local variables, and incorporate the pipeline execution code into an output of a compiler.

Example 8 includes the semiconductor apparatus of Example 7, wherein the pipeline execution code is to include an initialization of a pool of buffer storage for the one or more local variables.

Example 9 includes the semiconductor apparatus of Example 8, wherein the initialized pool of buffer storage is to be greater than a local storage amount corresponding to a single iteration of the loop.

Example 10 includes the semiconductor apparatus of Example 8, wherein the pipeline execution code is to further include a definition of a plurality of tokenized slots in the initialized pool of buffer storage, and wherein each tokenized slot is to correspond to a pipelined iteration of the loop.

Example 11 includes the semiconductor apparatus of Example 7, wherein the pipeline execution code is to include a pipeline depth definition.

Example 12 includes the semiconductor apparatus of any one of Examples 7 to 11, wherein the one or more local variables are to be detected after a registerization of the source code, automatic generation of the pipeline execution code is to be in response to detection of the one or more local variables, and the source code is to be associated with a communication channel in a dataflow graph.

Example 13 includes the semiconductor apparatus of any one of Examples 7 to 12, wherein the logic coupled to the one or more substrates includes transistor channel regions that are positioned within the one or more substrates.

Example 14 includes at least one computer readable storage medium comprising a set of instructions, which when executed by a computing system, cause the computing system to detect one or more local variables in source code, wherein the one or more local variables lack dependencies across iterations of a loop in the source code, automatically generate pipeline execution code for the one or more local variables, and incorporate the pipeline execution code into an output of a compiler.

Example 15 includes the at least one computer readable storage medium of Example 14, wherein the pipeline execution code is to include an initialization of a pool of buffer storage for the one or more local variables.

Example 16 includes the at least one computer readable storage medium of Example 15, wherein the initialized pool of buffer storage is to be greater than a local storage amount corresponding to a single iteration of the loop.

Example 17 includes the at least one computer readable storage medium of Example 15, wherein the pipeline execution code is to further include a definition of a plurality of tokenized slots in the initialized pool of buffer storage, and wherein each tokenized slot is to correspond to a pipelined iteration of the loop.

Example 18 includes the at least one computer readable storage medium of Example 14, wherein the pipeline execution code is to include a pipeline depth definition.

Example 19 includes the at least one computer readable storage medium of any one of Examples 14 to 18, wherein the one or more local variables are to be detected after a registerization of the source code, automatic generation of the pipeline execution code is to be in response to detection of the one or more local variables, and the source code is to be associated with a communication channel in a dataflow graph.

Example 20 includes a method of operating a compiler, the method comprising detecting one or more local variables in source code, wherein the one or more local variables lack dependencies across iterations of a loop in the source code, automatically generating pipeline execution code for the one or more local variables, and incorporating the pipeline execution code into an output of the compiler.

Example 21 includes the method of Example 20, wherein the pipeline execution code includes an initialization of a pool of buffer storage for the one or more local variables.

Example 22 includes the method of Example 21, wherein the initialized pool of buffer storage is to be greater than a local storage amount corresponding to a single iteration of the loop.

Example 23 includes the method of Example 21, wherein the pipeline execution code further includes a definition of a plurality of tokenized slots in the initialized pool of buffer storage, and wherein each tokenized slot is to correspond to a pipelined iteration of the loop.

Example 24 includes the method of Example 20, wherein the pipeline execution code includes a pipeline depth definition.

Example 25 includes the method of any one of Examples 20 to 24, wherein the one or more local variables are detected after a registerization of the source code, automatic generation of the pipeline execution code is in response to detection of the one or more local variables, and the source code is associated with a communication channel in a dataflow graph.

Example 26 includes means for performing the method of any one of Examples 20 to 25.

Thus, technology described herein may include an automated compiler transformation that can take as input a loop that has some form of local loop storage and dynamically pipeline the loop using one or more workers for a dataflow architecture such as CSA. The compiler may detect local storage remaining in loops after registerization and allocate enough memory to hold the private variables for a) each worker, and b) each concurrent execution of a worker. As each worker body commences execution, the worker body may be assigned a unique slot in the allocated private storage. When the worker completes execution of an iteration, the local storage slot associated with the worker may be automatically recycled for use in future iterations.

Several applications/benchmarks such as, for example, the SPGemm (sparse matrix-matrix multiplication) and Apriori benchmarks, may benefit from the transformation technology described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art.

Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and
a memory coupled to the processor, the memory including a set of executable program instructions, which when executed by the processor, cause the processor to:
detect one or more local variables in source code, wherein the one or more local variables lack dependencies across iterations of a loop in the source code,
automatically generate pipeline execution code for the one or more local variables, wherein the pipeline execution code is to include an initialization of a pool of buffer storage for the one or more local variables, wherein the pipeline execution code is to include a definition of a plurality of tokenized slots in the initialized pool of buffer storage, and wherein the tokenized slots are to correspond to a number of pipelined iterations of the loop that are to execute in parallel with each other, and
incorporate the pipeline execution code into an output of a compiler.

2. The computing system of claim 1, wherein the initialized pool of buffer storage is to be greater than a local storage amount corresponding to a single iteration of the loop.

3. The computing system of claim 1, wherein each tokenized slot is to correspond to a pipelined iteration of the loop.

4. The computing system of claim 1, wherein the pipeline execution code is to include a pipeline depth definition.

5. The computing system of claim 1, wherein the one or more local variables are to be detected after a registerization of the source code, automatic generation of the pipeline execution code is to be in response to detection of the one or more local variables, and the source code is to be associated with a communication channel in a dataflow graph.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
detect one or more local variables in source code, wherein the one or more local variables lack dependencies across iterations of a loop in the source code;
automatically generate pipeline execution code for the one or more local variables, wherein the pipeline execution code is to include an initialization of a pool of buffer storage for the one or more local variables, wherein the pipeline execution code is to include a definition of a plurality of tokenized slots in the initialized pool of buffer storage, and wherein the tokenized slots are to correspond to a number of pipelined iterations of the loop that are to execute in parallel with each other; and
incorporate the pipeline execution code into an output of a compiler.

7. The semiconductor apparatus of claim 6, wherein the initialized pool of buffer storage is to be greater than a local storage amount corresponding to a single iteration of the loop.

8. The semiconductor apparatus of claim 6, wherein each tokenized slot is to correspond to a pipelined iteration of the loop.

9. The semiconductor apparatus of claim 6, wherein the pipeline execution code is to include a pipeline depth definition.

10. The semiconductor apparatus of claim 6, wherein the one or more local variables are to be detected after a registerization of the source code, automatic generation of the pipeline execution code is to be in response to detection of the one or more local variables, and the source code is to be associated with a communication channel in a dataflow graph.

11. The semiconductor apparatus of claim 6, wherein the logic coupled to the one or more substrates includes transistor channel regions that are positioned within the one or more substrates.

12. At least one non-transitory computer readable storage medium comprising a set of instructions, which when executed by a computing system, cause the computing system to:
detect one or more local variables in source code, wherein the one or more local variables lack dependencies across iterations of a loop in the source code;
automatically generate pipeline execution code for the one or more local variables, wherein the pipeline execution code is to include an initialization of a pool of buffer storage for the one or more local variables, wherein the pipeline execution code is to include a definition of a plurality of tokenized slots in the initialized pool of buffer storage, and wherein the tokenized slots are to correspond to a number of pipelined iterations of the loop that are to execute in parallel with each other; and
incorporate the pipeline execution code into an output of a compiler.

13. The at least one non-transitory computer readable storage medium of claim 12, wherein the initialized pool of buffer storage is to be greater than a local storage amount corresponding to a single iteration of the loop.

14. The at least one non-transitory computer readable storage medium of claim 12, wherein each tokenized slot is to correspond to a pipelined iteration of the loop.

15. The at least one non-transitory computer readable storage medium of claim 12, wherein the pipeline execution code is to include a pipeline depth definition.

16. The at least one non-transitory computer readable storage medium of claim 12, wherein the one or more local variables are to be detected after a registerization of the source code, automatic generation of the pipeline execution code is to be in response to detection of the one or more local variables, and the source code is to be associated with a communication channel in a dataflow graph.

17. A method comprising:
detecting one or more local variables in source code, wherein the one or more local variables lack dependencies across iterations of a loop in the source code;
automatically generating pipeline execution code for the one or more local variables, wherein the pipeline execution code includes an initialization of a pool of buffer storage for the one or more local variables, wherein the pipeline execution code includes a definition of a plurality of tokenized slots in the initialized pool of buffer storage, and wherein the tokenized slots correspond to a number of pipelined iterations of the loop that will execute in parallel with each other; and
incorporating the pipeline execution code into an output of a compiler.

18. The method of claim 17, wherein the initialized pool of buffer storage is to be greater than a local storage amount corresponding to a single iteration of the loop.

19. The method of claim 17, wherein each tokenized slot is to correspond to a pipelined iteration of the loop.

20. The method of claim 17, wherein the pipeline execution code includes a pipeline depth definition.

21. The method of claim 17, wherein the one or more local variables are detected after a registerization of the source code, automatic generation of the pipeline execution code is in response to detection of the one or more local variables, and the source code is associated with a communication channel in a dataflow graph.

* * * * *